(12) United States Patent
'T Mannetje

(10) Patent No.: US 12,193,416 B2
(45) Date of Patent: Jan. 14, 2025

(54) AUTOMATIC FEEDING SYSTEM, BARN FOR HOUSING ANIMALS USING SUCH A SYSTEM, AUTONOMOUSLY MOVEABLE FEEDING DEVICE FOR USE IN SUCH A SYSTEM, AND IMPACT ELEMENT FOR USE IN SUCH A SYSTEM

(71) Applicant: LELY PATENT N.V., Maassluis (NL)

(72) Inventor: Leon 'T Mannetje, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 987 days.

(21) Appl. No.: 17/273,368

(22) PCT Filed: Sep. 19, 2019

(86) PCT No.: PCT/NL2019/050623
§ 371 (c)(1),
(2) Date: Mar. 4, 2021

(87) PCT Pub. No.: WO2020/067885
PCT Pub. Date: Apr. 2, 2020

(65) Prior Publication Data
US 2021/0345578 A1    Nov. 11, 2021

(30) Foreign Application Priority Data

Sep. 28, 2018  (NL) .................................... 2021727

(51) Int. Cl.
*A01K 5/02*   (2006.01)
*B60R 19/02*  (2006.01)
(Continued)

(52) U.S. Cl.
CPC .......... *A01K 5/0266* (2013.01); *B60R 19/023* (2013.01); *B60T 7/22* (2013.01); *G05D 1/0227* (2013.01); *A01K 1/0017* (2013.01)

(58) Field of Classification Search
CPC ........ A01K 5/0266; A01K 1/10; A01K 1/105; B60R 19/023; B60T 7/22
See application file for complete search history.

(56) References Cited

U.S. PATENT DOCUMENTS 3,204,607 A * 9/1965 Arnold ..................... A01K 9/00
                                                          119/71
10,004,207 B2 * 6/2018 Van Den Berg ....... A01K 5/004
(Continued)

FOREIGN PATENT DOCUMENTS

CA     2843302 A1 *  8/2014  ............. A01K 5/004
CN   107667894 A     2/2018
(Continued)

OTHER PUBLICATIONS

International Search Report, issued in PCT/NL2019/050623, dated Mar. 3, 2020.
(Continued)

*Primary Examiner* — Yvonne R Abbott-Lewis
(74) *Attorney, Agent, or Firm* — Birch, Stewart, Kolasch & Birch, LLP

(57) ABSTRACT

An automatic feeding system includes an autonomously moveable feeding device for feeding animals. The feeding device includes a feed container for accommodating feed, a feed dispensing device for dispensing feed from the feed container, and a safety device suitable for halting the autonomously moveable feeding device in case of collision with an obstacle. The safety device includes a bumper for establishing a first contact with such an obstacle. The bumper defines an outer safety contour of the autonomously moveable feeding device. The safety device further includes a partition opener configured to open a partition provided in a door opening for enabling the autonomously moveable feeding device to pass through the door opening. The door opening provided with partition may be provided in a barn for
(Continued)

housing animals. The opening device is provided separately and independently from and is not directly, connected to the safety device. In this way, the partition opener acts independently from and does not affect the safety device.

18 Claims, 7 Drawing Sheets

(51) Int. Cl.
*B60T 7/22* (2006.01)
*G05D 1/00* (2006.01)
*A01K 1/00* (2006.01)

(56) References Cited

U.S. PATENT DOCUMENTS

| | | | |
|---|---|---|---|
| 10,136,616 B2 * | 11/2018 | Van Den Berg | A01D 87/003 |
| 10,401,867 B2 * | 9/2019 | Strautmann | G05D 1/024 |
| 10,558,223 B2 * | 2/2020 | Leclair | G05D 1/0259 |
| 11,252,935 B2 * | 2/2022 | Van Kuilenburg | A01K 5/02 |
| 2010/0326363 A1 | 12/2010 | Van Den Berg | |
| 2015/0075436 A1 | 3/2015 | Wisse et al. | |

FOREIGN PATENT DOCUMENTS

| | | | | |
|---|---|---|---|---|
| WO | WO-2013004485 A1 * | 1/2013 | | A01K 1/105 |
| WO | WO-2013112042 A1 * | 8/2013 | | A01K 1/105 |
| WO | WO 2014/044629 A1 | 3/2014 | | |

OTHER PUBLICATIONS

Lely, "Lely Vector", Sep. 6, 2018, XP055594020, Retrieved from the Internet: URL:https://www.lely.com/media/filer_public/82/ec/82ecb316-eea2-4902-adf7-8fe2ca998008/lely_vector_2018_en-us.pdf, total 15 pages.

Written Opinion of the International Searching Authority, issued in PCT/NL2019/050623, dated Mar. 3, 2020.

* cited by examiner

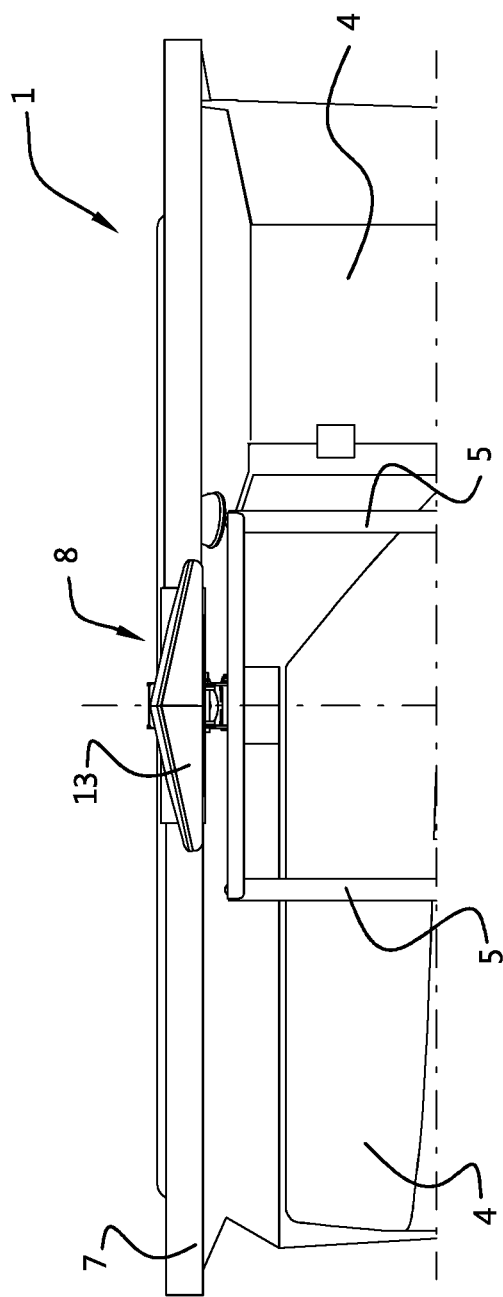
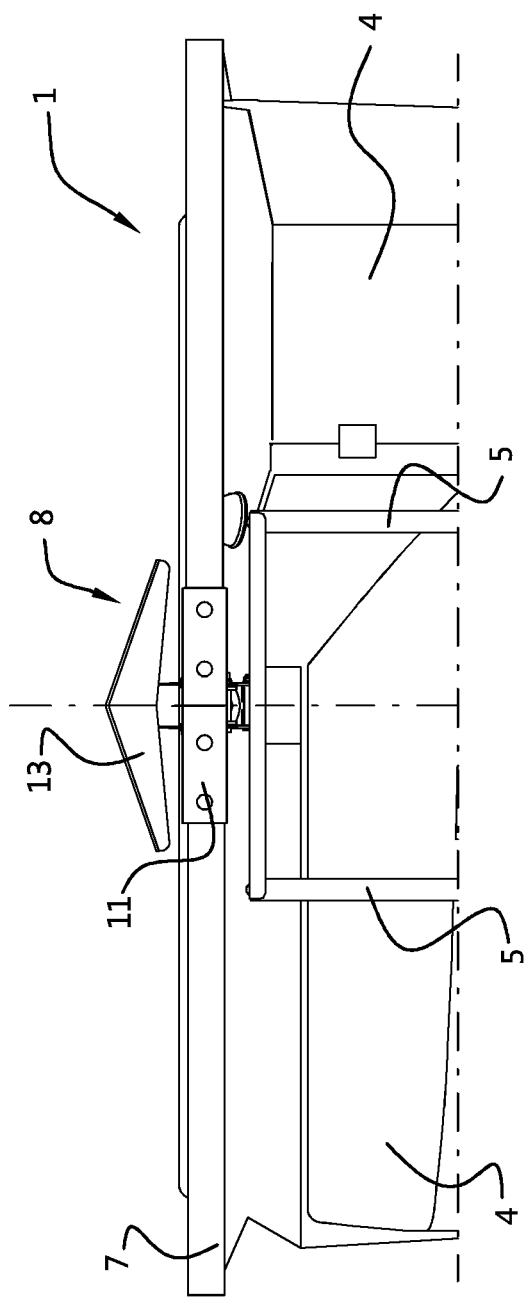

AUTOMATIC FEEDING SYSTEM, BARN FOR HOUSING ANIMALS USING SUCH A SYSTEM, AUTONOMOUSLY MOVEABLE FEEDING DEVICE FOR USE IN SUCH A SYSTEM, AND IMPACT ELEMENT FOR USE IN SUCH A SYSTEM

The present invention relates to an automatic feeding system comprising an autonomously moveable feeding device for feeding animals, said device comprising a feed container for accommodating feed, a feed dispensing device for dispensing feed from the feed container, a safety device suitable for halting the autonomously moveable feeding device in case of collision with an obstacle, said safety device comprising a bumper for establishing a first contact with such an obstacle, said bumper defining an outer safety contour of the autonomously moveable feeding device, and a partitioning means opening device configured to open partitioning means provided in a door opening for enabling the autonomously moveable feeding device to pass through the door opening.

Such automatic feeding systems for processing feed for livestock are known in the art, e.g. the Lely Vector®. In the known system, the partitioning means opening device is partly mounted on the safety device. There is a need for an improved device.

It is an object of the present invention to provide an improved automatic feeding system.

The invention achieves the object at least in part by means of a system according to claim 1, in particular an automatic feeding system comprising an autonomously moveable feeding device for feeding animals, said device comprising a feed container for accommodating feed, a feed dispensing device for dispensing feed from the feed container, a safety device suitable for halting the autonomously moveable feeding device in case of collision with an obstacle, said safety device comprising a bumper for establishing a first contact with such an obstacle, said bumper defining an outer safety contour of the autonomously moveable feeding device, and a partitioning means opening device configured to open partitioning means provided in a door opening for enabling the autonomously moveable feeding device to pass through the door opening, wherein the opening device is provided separately and independently from and is not directly connected to the safety device.

In this way, the partitioning means opening device acts independently from and does not affect the safety device. This offers i.a. the advantage that the safety device can be adjusted more accurately, which enhances the safety of the system.

The invention further relates to a barn for housing animals, wherein an automatic feeding system is provided for feeding the animals in the barn, wherein the barn comprises at least one door opening provided with partitioning means and wherein the partitioning means opening device of the autonomously moveable feeding device is configured to open the partitioning means provided in the door opening when the autonomously moveable feeding device passes through the door opening.

In this way, an improved barn for housing animals is provided, wherein the autonomously moveable feeding device can easily pass through door openings with partitioning means.

The invention further relates to an improved autonomously moveable feeding device for use in an automatic feeding system.

The invention further relates to an impact element for use in an automatic feeding system.

Suitable and advantageous embodiments are described in the dependent claims, as well as in the description below.

In a first embodiment of the automatic feeding system the opening device is mounted directly and solely on the feed container and is provided with an opening element and a guiding strip for the partitioning means. This constitutes a simple, cheap and reliable construction.

Advantageously, the opening element comprises a resiliently mounted impact element for the partitioning means, said impact element protruding beyond the outer safety contour of the autonomously moveable feeding device in a first active position and being suitable for retracting to a second inactive position within the outer safety contour of the autonomously moveable feeding device in case of collision with an obstacle. In this way it is ensured that the opening action does not interfere with the safety device.

In a further embodiment of the system, the impact element is resiliently mounted by means of a spring-loaded parallelogram construction. This constitutes a simple, yet reliable construction.

The system may advantageously be designed such that the impact element, viewed from above, is v-shaped. Thus, an efficient opening action is achieved.

Furthermore, the impact element may advantageously be provided with a curtain splitter element, which, viewed from above, is more acutely v-shaped than the impact element. This embodiment is especially suitable for splitting the strips or flaps of an animal space partitioning curtain.

Advantageously, the curtain splitter element is mounted so as to be moveable upwards. This allows for a better strip opening action.

In a highly advantageous embodiment, the curtain splitter element has a passive position in which it is positioned, viewed from the side, substantially below the upper rim of the feed container, and an active position in which it is positioned, viewed from the side, substantially above said upper rim. In this way, a very good strip opening action is achieved, even though the autonomously moveable feeding device remains compact when the curtain splitter is not in use.

In an advantageous embodiment, the guiding strip extends at least around the front side and the lateral sides of the autonomously moveable feeding device. This enables a smooth passing of the door opening with the partitioning means.

In a still further embodiment the guiding strip extends substantially completely around the autonomously moveable feeding device. In this way, it is also possible to pass the door opening with the partitioning means backwards.

Advantageously, the guiding strip, viewed from above, protrudes beyond the outer safety contour substantially everywhere. This guarantees a smooth passing without interfering with the safety device.

In a further embodiment, the autonomously moveable feeding device is provided with a mixing device inside the feed container for mixing feed, wherein the mixing device comprises knives for cutting feed. In this way a more versatile feeding system is achieved.

In accordance with the invention, in the barn for housing animals using the automatic feeding system the partitioning means may advantageously comprise saloon type doors, the opening element being provided with an impact element. This is a simple and straightforward implementation.

Alternatively, in the barn for housing animals using the automatic feeding system the partitioning means may comprise curtain strips or flaps, while the opening element is provided with a curtain splitter element. This constitutes a cheap alternative embodiment.

The invention will now be further explained with reference to the following Figures.

FIGS. 7A and 7B show front views of a second embodiment of an autonomously moveable feeding device for feeding animals according to the invention;

Figure 1:
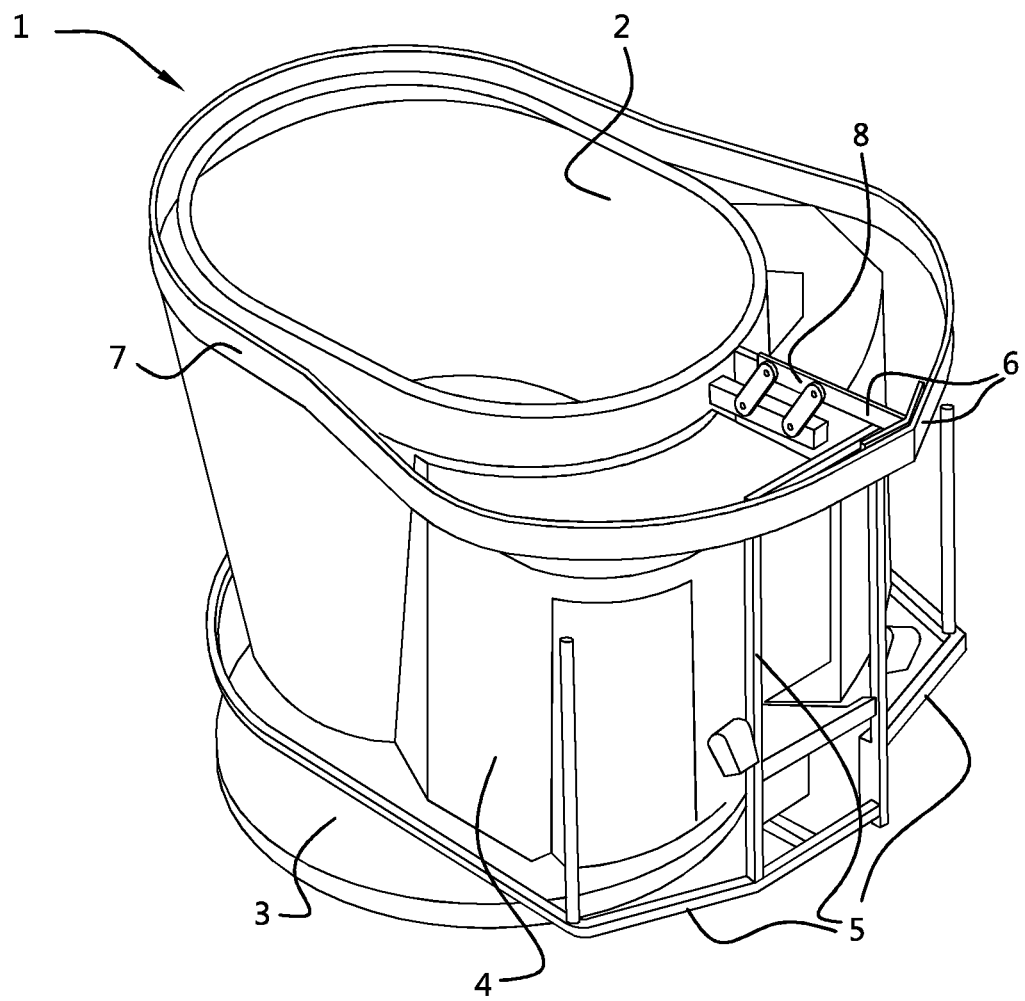
FIG. 1 shows an autonomously moveable feeding device for feeding animals according to the invention in a perspective view.

In a barn for housing animals an automatic feeding system can be used for feeding the animals in the barn. Automatic feeding systems, such as the Lely Vector®, for processing feed for livestock are known. FIG. 1 shows an autonomously moveable feeding device for feeding animals according to the invention in a perspective view.

By means of a loading device, which may preferably be automatic, the feed can be loaded into the feed container 2 of the autonomously moveable feeding device 1, e.g. in a (remote) feed kitchen with one or more feed piles. The feed container 2 has a dispensing opening (not shown) through which the feed can be dispensed automatically at the appropriate location. The autonomously moveable feeding device 1 is advantageously provided with a mixing device (not shown) inside the feed container for mixing feed. An undercarriage 3 serves to move the device 1 as a whole. This makes it possible to dispense feed at different locations, for example in a feed alley of the barn. The feeding device 1 is self-propelled and to this end provided with a drive means (not shown) and a control device provided in a closet 4 at the front side of the device. This closet 4 also comprises the dispensing device for the feed.

A safety device 5 in the form of a substantially horizontally extending bumper bar positioned around the bottom of the device 1 with a number of substantially vertical bars at the front of the device 1 is provided for establishing a first contact with an obstacle, said bumper defining an outer safety contour of the autonomously moveable feeding device 1. Such a safety device 5 is known as such and is suitable for halting the autonomously moveable feeding device 1 in case of collision with an obstacle. The control device in closet 4 is suitable for determining whether the safety device 5 has hit an obstacle and in that case stopping the device 1 in order to avoid damage. The device 1 can move over the ground floor autonomously with the aid of the undercarriage 3 and under the control of the control device in the closet 4.

It is noted that also other automatic feeding systems exist in which the autonomously moveable feeding device is hanging from a rail. The invention with all its advantages is just as well applicable to such systems.

Such an automatic feeding system is particularly suitable for feeding straw, grass and grass products which have to be cut and/or mixed. This takes place in the feed container 2, which is a receptacle with a substantially upright side wall. The receptacle is slightly elongate in order to prevent feed from just being rotated without being mixed or cut. This mixing and/or cutting is carried out by means of a mixing device which can comprise an auger. If desired, it can also comprise a bottom scraper. The feed is already shredded and thus easily mixable.

A barn for housing animals typically has different compartments which are separated by means of door openings provided with partitioning means. Such partitioning means may comprise well-known saloon type doors or curtain strips or flaps. The autonomously moveable feeding device 1 is provided with a partitioning means opening device 6 configured to open the partitioning means provided in the door opening when the autonomously moveable feeding device 1 passes through the door opening. This opening device 6 comprises a guiding strip 7 for the partitioning means along the upper side of the device 1 and an opening element 8 for the partitioning means.

In accordance with the invention, the partitioning means opening device 6 is provided separately and independently from and is not directly connected to the safety device 5. This will be further elucidated below.

Figure 2:
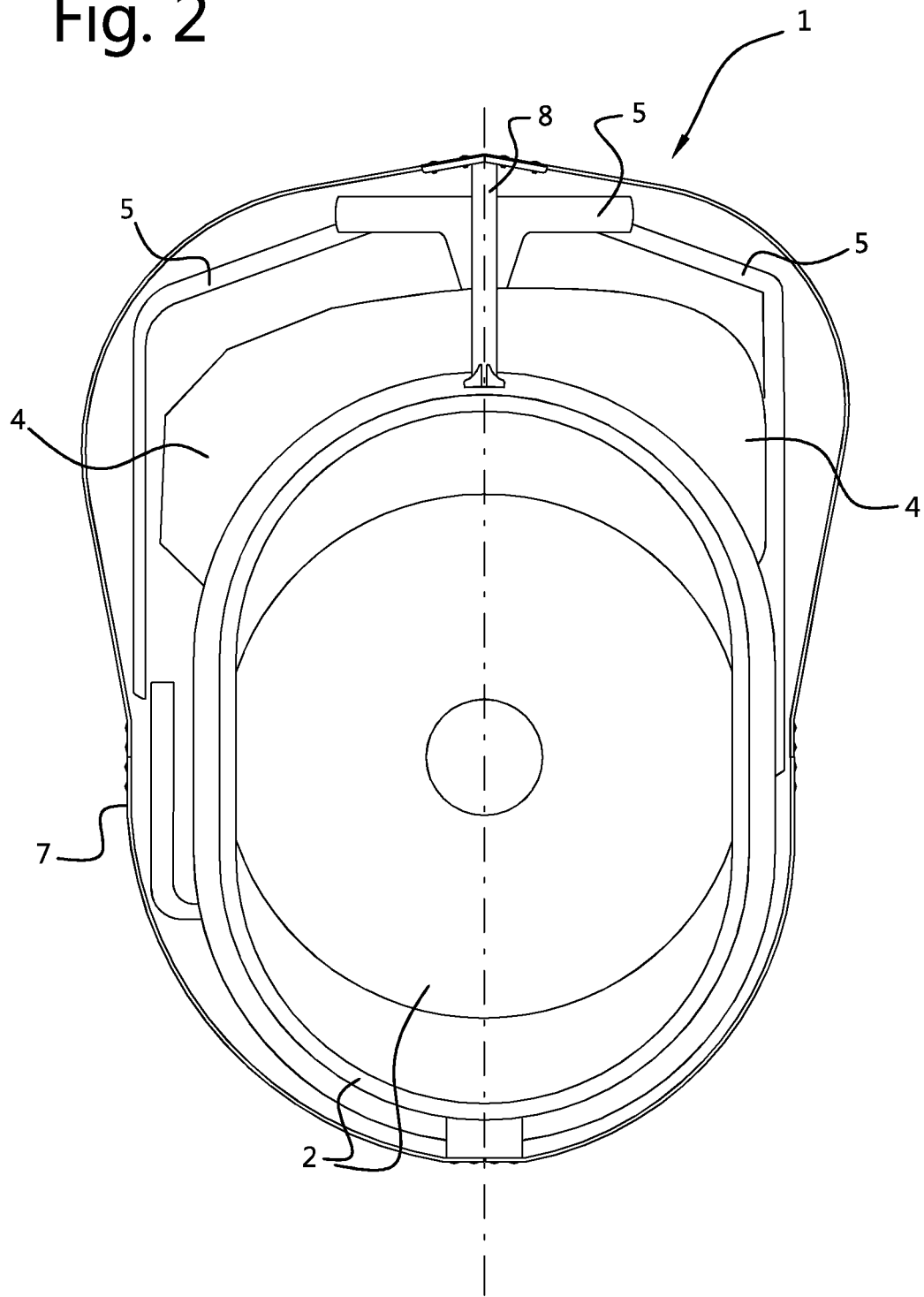
FIG. 2 shows a top view of a first embodiment of an autonomously moveable feeding device for feeding animals according to the invention.

FIG. 2 shows a top view of a first embodiment of an autonomously moveable feeding device for feeding animals according to the invention. The device 1 is provided with the feed container 2, which may contain a mixing device (not shown), as already explained above. The closet 4 contains the control device and the feed dispensing device. In a known manner, the safety device 5 extends along the front and the sides of the device 1. It defines an outer safety contour of the autonomously moveable feeding device 1. As soon as an obstacle hits the safety device 5 with at least a certain adjustable preset force or momentum, the device 1 is halted.

The partitioning means opening device is able to open partitioning means, such as saloon doors, without activating the safety device 5. To this end, it extends outside the safety device 5, seen in a top view. Thus, the opening device 6 will touch the partitioning means and open these without these getting into contact with the safety device 5.

The partitioning means opening device has the strip 7 extending all around the device 1 and outside of its safety contour. The partitioning means opening device further has the opening element 8 mounted on the feed container 2 at the front side and connected to the strip 7. The opening device is mounted directly and solely on the feed container 2. In this way, the partitioning means opening device 6 acts independently from and does not affect the safety device 5. This offers i.a. the advantage that the safety device 5 can be adjusted more accurately, which enhances the safety of the system.

The guiding strip 7 extends at least around the front side and the lateral sides of the autonomously moveable feeding device 1. In this embodiment, the guiding strip 7 extends completely around the autonomously moveable feeding device 1. This offers the advantage that the device 1 may also pass through door openings with partitioning means backwards. Viewed from above, the guiding strip 7 protrudes beyond the outer safety contour substantially everywhere.

Figure 3:
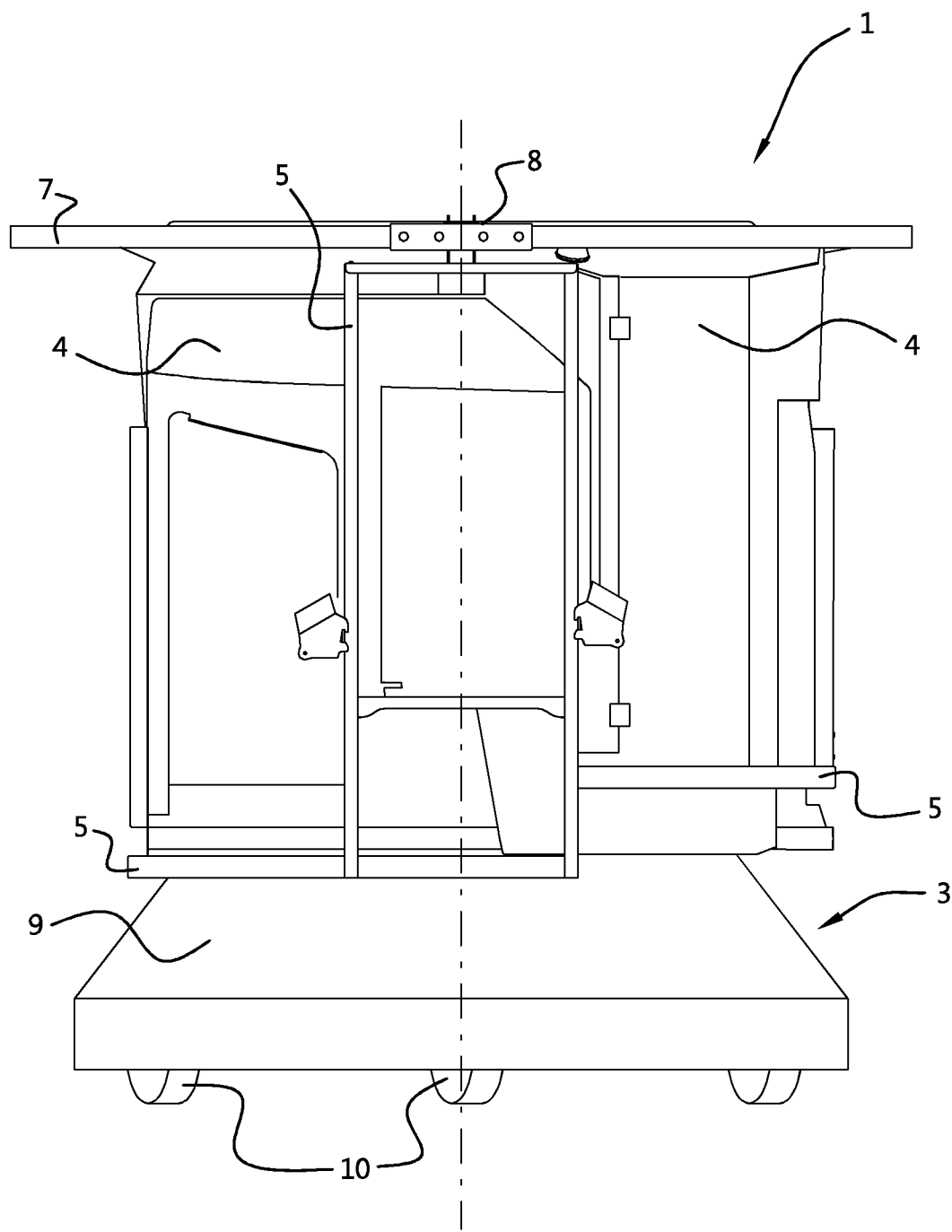
FIG. 3 shows a front view of a first embodiment of an autonomously moveable feeding device for feeding animals according to the invention.

FIG. 3 shows a front view of a first embodiment of an autonomously moveable feeding device for feeding animals according to the invention. The undercarriage 3 comprises a skirt 9 and wheels 10. The closet 4 extends in front of the feed container 2 (not visible in this Figure). The safety device 5 has substantially horizontal bumper parts and substantially vertical bar parts. The partitioning means opening device 6 with the strip 7 and the opening element 8 is seen at the top.

Figure 4:
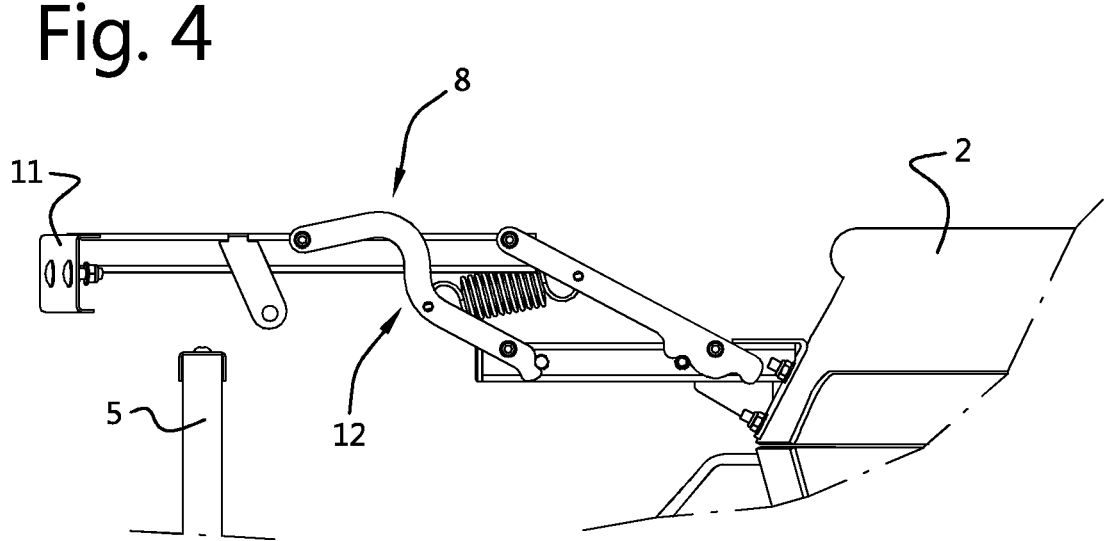
FIG. 4 shows a first embodiment of an opening device according to the invention in a side view.
Figure 5:
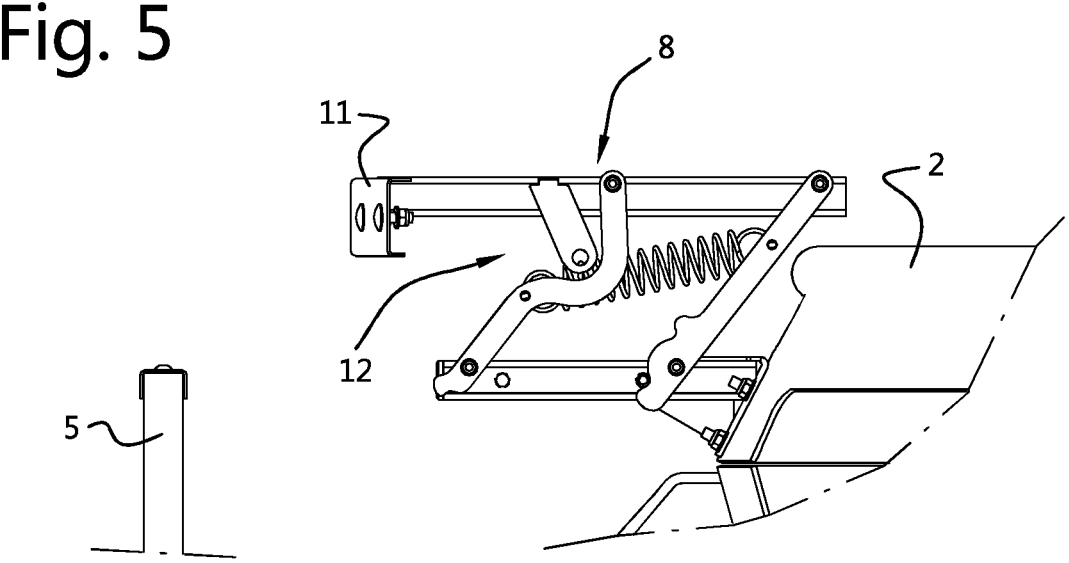
FIG. 5 shows the opening device of FIG. 3 in a retracted position.

FIG. 4 shows a first embodiment of an opening device according to the invention in a side view. Mounted on the feed container 2, below its upper rim, is the opening element 8, comprising an impact element 11 for the partitioning means, said impact element 11 being resiliently mounted by means of a spring-loaded parallelogram construction 12. The impact element 11 protrudes beyond the outer safety contour of the autonomously moveable feeding device 1 in a first active position and is suitable for being retracted in to a second inactive position within the outer safety contour of the autonomously moveable feeding device 1 in case of collision with an obstacle. This is depicted in FIG. 5. The impact element 11, viewed from above, is v-shaped, providing for an efficient opening action. Here it is noted that also other shapes are possible for the impact element 11, e.g. spherical, or diamond-shaped, or concavely shaped (outwardly directed) in any other way.

As soon as the partitioning means, e.g. saloon doors, get in contact with the impact element 11, they will be opened and guided along the device 1 with the aid of the strip 7. However, in case an obstacle should hit the impact element 11, then it can retract by means of its resilient mounting into the position of FIG. 5 within the safety contour. In that case, the safety device 5 will become active and avoid any damage in the usual way. So the opening element 8 does not interfere with the safety device 5. Of course, the force or momentum needed to retract the impact element 11 is also adjustable and preset at an appropriate level, which may be lower than the level needed to activate the safety device 5. In this way, the opening element 8 is also protected from being damaged by means of its resilient mounting.

It is noted that the spring-loaded parallelogram construction 12 in FIGS. 4 and 5 is depicted with an actual spring. However, this element is not necessary, as it has turned out that without the spring the parallelogram construction 12 is still spring-loaded, because in that case the strip 7, which is directly connected to the opening element 8, acts as a leaf spring. This can be seen in e.g. FIGS. 1 and 2.

The first embodiment of the autonomously moveable feeding device 1 described with reference to FIGS. 2-5 is especially suitable for use with partitioning means such as saloon doors.

The further FIGS. 6-9 illustrate a further embodiment of the invention which is especially suitable for use with partitioning means such as curtain strips or flaps.

Figure 6:
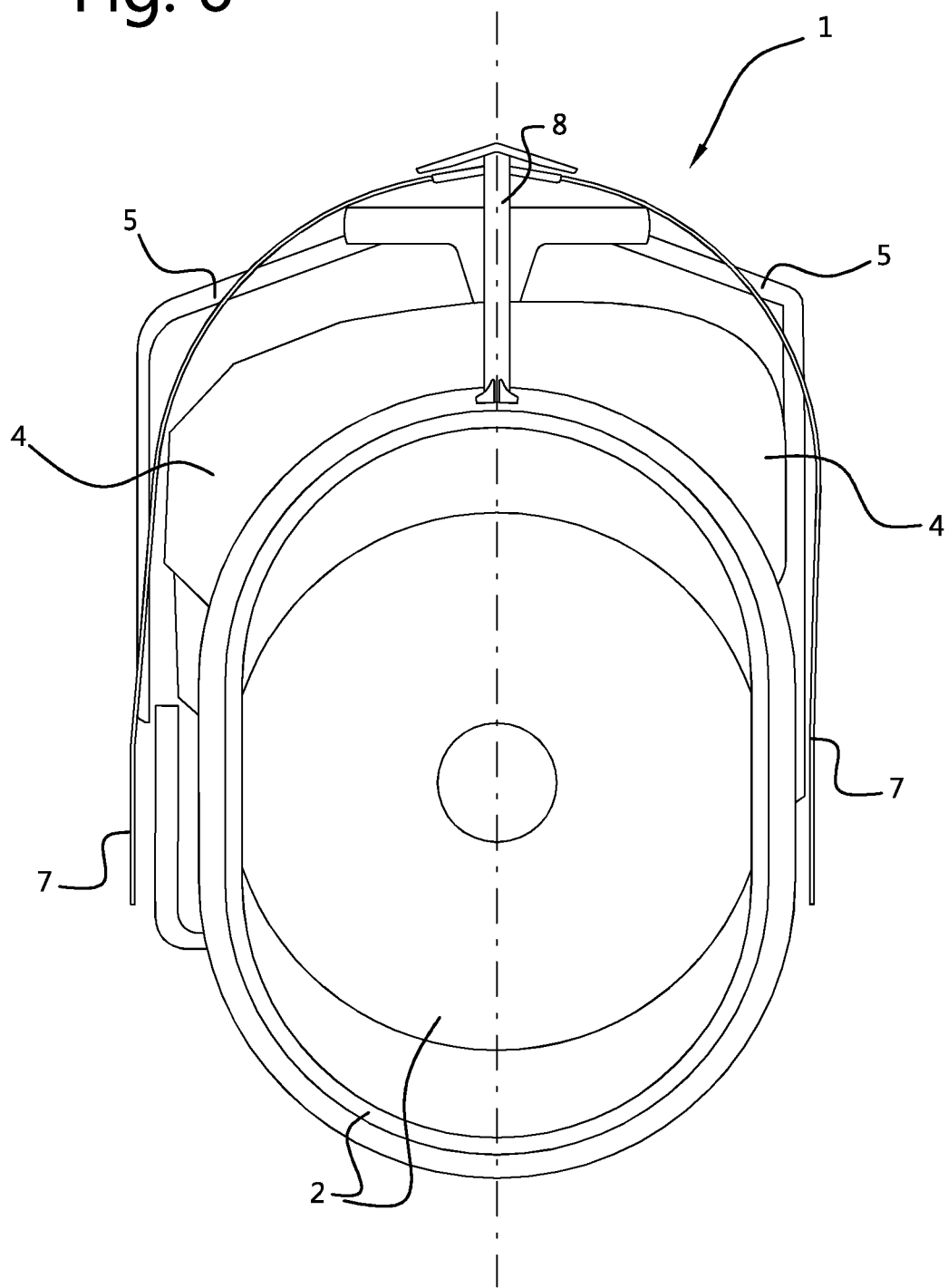
FIG. 6 shows a top view of a second embodiment of an autonomously moveable feeding device for feeding animals according to the invention.

FIG. 6 shows a top view of a second embodiment of an autonomously moveable feeding device for feeding animals according to the invention. Again, the device 1 is provided with the feed container 2, which may contain a mixing device (not shown). The closet 4 contains the control device and the feed dispensing device. The safety device 5 extends along the front and the sides of the device 1. It defines an outer safety contour of the autonomously moveable feeding device 1. As soon as an obstacle hits the safety device 5 with at least a certain adjustable preset force or momentum, the device 1 is halted.

The partitioning means opening device is able to open partitioning means, such as curtain strips or flaps, without activating the safety device 5. To this end, it extends mostly outside the safety device 5, seen in a top view. Thus, the opening device 6 will touch the partitioning means and open these without these getting into contact with the safety device 5, or at least without activating it.

The partitioning means opening device has the strip 7 extending along the sides and the front of the device 1 mostly outside of its safety contour. The partitioning means opening device further has the opening element 8 mounted on the feed container 2 at the front side and connected to the strip 7. Again, the opening device is mounted directly and solely on the feed container 2. In this way, the partitioning means opening device 6 acts independently from and does not affect the safety device 5. This offers i.a. the advantage that the safety device 5 can be adjusted more accurately, which enhances the safety of the system.

FIGS. 7A and 7B show front views of the upper part of the second embodiment of an autonomously moveable feeding device for feeding animals according to the invention. The closet 4 extends in front of the feed container 2 (not visible in these Figures). The safety device 5 has substantially horizontal bumper parts and substantially vertical bar parts. The partitioning means opening device 6 with the strip 7 and the opening element 8 is seen at the top. This time, the impact element 11 is provided with a curtain splitter element 13, which, viewed from above, is more acutely v-shaped than the impact element. This enables a very good opening action. Here it is noted again that also other shapes are possible for the curtain splitter element 13, e.g. spherical, or diamond-shaped, or concavely shaped (outwardly directed) in any other way.

The curtain splitter element 13 is mounted so as to be moveable upwards. In the embodiment shown, it is mounted in a swivelable way. As soon as the partitioning means curtain touches the element 13, it swivels upwards. In this way, an even better opening action is being achieved. In FIG. 7A the curtain splitter 13 is in its low, passive (rest) position. In FIG. 7B the curtain splitter element 13 is swiveled upwards.

Figure 8:
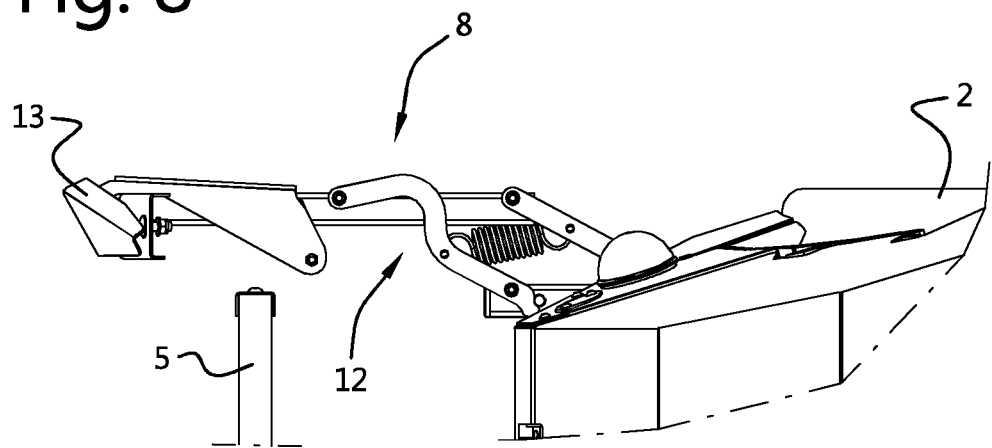
FIG. 8 shows a second embodiment of an opening device with an impact element according to the invention in a side view.
Figure 9:
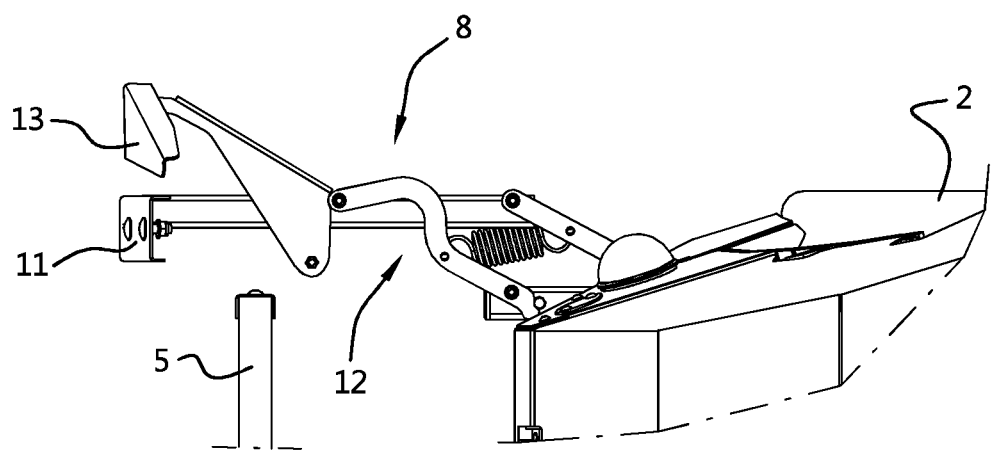
FIG. 9 shows the opening device of FIG. 8 with the impact element pivoted upwards.

FIG. 8 shows a second embodiment of an opening device with an impact element according to the invention in a side view. FIG. 9 shows the opening device of FIG. 8 with the impact element pivoted upwards. Mounted on the feed container 2, below its upper rim, is the opening element 8, comprising an impact element 11 for the partitioning means, said impact element 11 being resiliently mounted by means of a spring-loaded parallelogram construction 12. The impact element 11 protrudes beyond the outer safety contour of the autonomously moveable feeding device 1 in a first active position and is suitable for being retracted in to a second inactive position within the outer safety contour of the autonomously moveable feeding device 1 in case of collision with an obstacle. The impact element 11, viewed from above, is v-shaped, and is provided with the pivotably mounted curtain splitter element 13. Of course, also other shapes are possible for the impact element 11 and/or the curtain splitter element 13, e.g. spherical, or diamond-shaped, or concavely shaped (outwardly directed) in any other way.

As soon as the partitioning means, i.c. the curtain strips or flaps, get in contact with the curtain splitter element 13, the element 13 will move upwards and the curtain will be opened and guided along the device 1 with the aid of the strip 7. However, in case an obstacle should hit the element 13, then the opening element 8 as a whole can retract by means of its resilient mounting into a position within the safety contour, just as shown and described in FIG. 5 with reference to the first embodiment. In that case, the safety device 5 will become active and avoid any damage in the usual way. So again the opening element 8 does not interfere with the safety device 5. Of course, the force or momentum needed to retract the impact element 11 is also adjustable and preset at an appropriate level, which may be lower than the level needed to activate the safety device 5. In this way, the opening element 8 is also protected from being damaged by means of its resilient mounting.

Again, it is noted that the spring-loaded parallelogram construction 12 in FIGS. 8 and 9 is depicted with an actual spring. However, this element is not necessary, as it has turned out that without the spring the parallelogram construction 12 is still spring-loaded, because in that case the strip 7, which is directly connected to the opening element 8, acts as a leaf spring. This can be seen in e.g. FIG. 6.

Advantageously, the curtain splitter element 13 has a passive position in which it is positioned, viewed from the side, substantially below the upper rim of the feed container 2, and an active position in which it is positioned, viewed from the side, substantially above said upper rim. In this way, a very good strip opening action is achieved, even though the autonomously moveable feeding device 1 remains compact when the curtain splitter 13 is not in use.

As disclosed above, the autonomously moveable feeding device 1 is provided with a mixing device inside the feed container 2 for mixing feed, wherein the mixing device comprises knives for cutting feed. It is important that any curtain strips or flaps of the partitioning means do not get in to the feed container 2, as they would be damaged by the knives. The partitioning means opening device 6 according to the invention with the guiding strip 7 efficiently avoids this.

The invention claimed is:

1. An automatic feeding system comprising:
    an autonomously moveable feeding device for feeding animals, said device comprising:
        a feed container for accommodating feed;
        a feed dispensing device for dispensing feed from the feed container;
        a safety device suitable for halting the autonomously moveable feeding device in case of collision with an obstacle, said safety device comprising a bumper for establishing a first contact with the obstacle, said bumper defining an outer safety contour of the autonomously moveable feeding device; and
        a partition opener configured to open a partition provided in a door opening for enabling the autonomously moveable feeding device to pass through the door opening,
        wherein the opening device is provided separately and independently from and is not directly connected to the safety device,
        wherein the partition opener is mounted directly and solely on the feed container and is provided with an opening element and a guiding strip for the partition, and
        wherein the opening element comprises a resiliently mounted impact element for the partition, said impact element protruding beyond the outer safety contour of the autonomously moveable feeding device in a first active position and being suitable for retracting to a second inactive position within the outer safety contour of the autonomously moveable feeding device in case of collision with an obstacle.

2. The automatic feeding system according to claim 1, wherein the impact element is resiliently mounted by a spring-loaded parallelogram construction.

3. The automatic feeding system according to claim 2, wherein the impact element, viewed from above, is v-shaped.

4. The automatic feeding system according to claim 2, wherein the impact element is provided with a curtain splitter element, which, viewed from above, is more acutely v-shaped than the impact element.

5. The automatic feeding system according to claim 1, wherein the impact element, viewed from above, is v-shaped.

6. The automatic feeding system according to claim 5, wherein the impact element is provided with a curtain splitter element, which, viewed from above, is more acutely v-shaped than the impact element.

7. The automatic feeding system according to claim 1, wherein the impact element is provided with a curtain splitter element, which, viewed from above, is more acutely v-shaped than the impact element.

8. The automatic feeding system according to claim 7, wherein the curtain splitter element is mounted so as to be moveable upwards.

9. The automatic feeding system according to claim 8, wherein the curtain splitter element has a passive position in which it is positioned, viewed from the side, substantially below the upper rim of the feed container, and an active position in which it is positioned, viewed from the side, substantially above said upper rim.

10. The automatic feeding system according to claim 1, wherein the guiding strip extends at least around the front side and the lateral sides of the autonomously moveable feeding device.

11. The automatic feeding system according to claim 10, wherein the guiding strip extends substantially completely around the autonomously moveable feeding device.

12. The automatic feeding system according to claim 10, wherein the guiding strip, viewed from above, protrudes beyond the outer safety contour substantially everywhere.

13. The automatic feeding system according to claim 1, wherein the autonomously moveable feeding device is provided with a mixing device inside the feed container for mixing feed, wherein the mixing device comprises knives for cutting feed.

14. An autonomously moveable feeding device for use in the automatic feeding system in accordance with claim 1.

15. An impact element for use in the automatic feeding system in accordance with claim 1.

16. A barn for housing animals, comprising an automatic feeding system comprising:
    an autonomously moveable feeding device for feeding animals, said device comprising:
        a feed container for accommodating feed;
        a feed dispensing device for dispensing feed from the feed container;
        a safety device suitable for halting the autonomously moveable feeding device in case of collision with an obstacle, said safety device comprising a bumper for establishing a first contact with the obstacle, said bumper defining an outer safety contour of the autonomously moveable feeding device; and a partition opener configured to open a partition provided in a door opening for enabling the autonomously moveable feeding device to pass through the door opening, wherein the opening device is provided separately and independently from and is not directly connected to the safety device, wherein the automatic feeding system is provided for feeding the animals in the barn, and wherein the barn comprises at least one door opening provided with the partition and wherein the partition opener of the autonomously moveable feeding device is configured to open the partition provided in the door opening when the autonomously moveable feeding device passes through the door opening.

17. The barn for housing animals as claimed in claim 16, wherein the partition comprises saloon type doors and the opening element is provided with an impact element.

18. The barn for housing animals as claimed in claim 16, wherein the partition comprises curtain strips or flaps and the opening element is provided with a curtain splitter element.

* * * * *